Patented Sept. 11, 1951

2,567,678

UNITED STATES PATENT OFFICE 2,567,678

AQUEOUS POLYVINYL ACETATE EMULSION PAINTS AND METHOD OF PREPARING SAME

George O. Morrison, Milltown, N. J., assignor to Shawinigan Products Corp., New York, N. Y., a corporation of New York No Drawing. Application November 1, 1946, Serial No. 707,347

16 Claims. (Cl. 260—22)

The present invention relates to aqueous emulsion paints capable of forming protective coatings on various surfaces, and more particularly to compositions of this type containing a dispersed resin component consisting essentially of a polyvinyl acetate resin produced by polymerization of vinyl acetate in aqueous emulsion.

The present application involves an improvement over the invention described in the pending application of Henry M. Collins and George O. Morrison for patent for Water-Resistant Films, Serial No. 598,383, filed June 8, 1945, now U. S. Patent 2,444,396 wherein there is described and claimed a process for the production of polyvinyl acetate emulsions capable of depositing water-resistant films under various conditions of temperature and humidity.

The present invention is concerned with the manufacture of a paint of the general type disclosed in the earlier application and is based upon certain further developments which have resulted in the production of a paint of improved keying and general adhesion characteristics, as well as improved hiding power, washability, paintability, and film-forming properties. By the term "keying" I have reference to the property of adhesion of the deposited film to old oil paint and similar films.

The term "paint" is now generally applied to various kinds of compositions composed essentially of a pigment, a binder, and usually also a volatile thinner, the composition when spread in a thin film being capable of drying either by oxidation of the binder or by evaporation of the thinner to yield a dry, continuous, decorative or protecting film, the paint composition being usually one which can be applied to a surface by brushing, spraying, roller coating, dipping or other conventional methods.

The general type of paints heretofore manufactured have been the oil paints and oleoresinous emulsion paints, both of which dry or cure by oxidation of the binder, and those which dry purely by evaporation of a thinner, such as casein and other protein paints, and pigmented lacquers. The oil paints are noted for the water-resistance and good keying properties of their films, but have the disadvantages that they require an organic solvent, or thinner, which is malodorous and inflammable, and more or less toxic, while a rather long time is consumed in the drying of the film. The oxidized films also change with time in various respects, such as color, adhesion, continuity of film, etc. Aqueous oleoresinous emulsion paints, on the other hand, can be thinned with water, the drying of such paint films occurring first by evaporation of the water, followed by oxidation of the oleoresinous films, so that in the application of such a paint the development of malodorous or inflammable or toxic vapors is greatly reduced or practically eliminated. Also, they are easier to apply than oil paints. The known oleoresinous aqueous emulsion paints, however, suffer from the disadvantages that they are water-sensitive, possessing poor scrubbability and washability; moreover, they do not key well to old films, especially when exposed to the elements, that is, when employed as an outdoor paint. Also the films obtained with such paints change with time in various respects, such as color, adhesion, flexibility, continuity of films, etc., owing to continuous oxidation.

The protein water paints, such as casein paints, and pigmented lacquers which dry by the evaporation of a thinner, differ from the above paints in that oxidation after the paint is applied plays no part in the actual formation of the paint film. The material which will form the paint film is present in the paint or lacquer and on application appears in film form by simple evaporation of the thinner. Protein water paints, since they are thinned with water, need not develop malodorous or inflammable odors on application and the time to dry to a dust-free condition is short. Their extreme water-sensitivity is such that they are not considered in applications where oil paints are used. Lacquers on the other hand, since they contain major amounts of organic thinners, develop on application malodorous and inflammable vapors. However, the time necessary to dry to a dust-free condition is short, they are easily applied, and are noted for the water-resistance of their films.

The lacquer type paint has advantages over the first type and would generally be preferred to the latter if some of its serious shortcomings could be overcome, as by increasing the film former and elimination of the volatile solvent.

Polyvinyl acetate gives excellent lacquer type coatings except for the low solids in the lacquers made from the polymers which give the best coatings. Emulsions of polyvinyl acetate offer good possibilities owing to control of viscosity, possibility of many high viscosity polymers, elimination of solvent, etc., but conventional polyvinyl acetate emulsions are unsuitable due to the water-sensitivity of films laid down from them.

It will be seen from the foregoing brief outline that oil paints on the one hand, and aqueous emulsion paints as heretofore manufactured on the other hand, each has its distinct advantages over the other, and, so far as I am aware, the advantages of each type have up to the present invention been regarded as peculiar and exclusive to that type. Thus, the water-proofness, good keying properties, and relatively good scrubbability and washability of oil paint films are not attainable with the known aqueous emulsion paints; on the other hand, the latter paints are not restricted to organic thinners but can be thinned with water and are thus cheaper to manufacture and are also more convenient to use, develop little of malodorous vapors and dry more rapidly.

Attempts to improve the properties of films deposited by aqueous emulsion paints have met with many difficulties arising largely from the fact that these emulsions are highly complex and sensitive mixtures. Whereas in an oil paint the oily vehicle is in more or less stable solution in the organic thinner, the materials comprising the paint being organophilic in character, so that stable equilibrium is relatively easily attained, in the case of an aqueous emulsion paint there is present an organic resinous material dispersed in an aqueous medium in which it is insoluble, the resinous material being kept in suspension with the aid of various additions, all of the materials having various physical actions on each other which must be taken into account to prevent breaking of the emulsion under various conditions of manufacture, transportation, storage and use.

Despite these difficulties encountered in the use of aqueous polyvinyl acetate emulsions, the present invention aims to provide paints having such emulsions as a base, which paints are to be of such character that despite their aqueous nature, and despite a further addition of a hydrophobic nature contemplated by the present invention, they will deposit a uniform film which on drying at room temperature is highly water-resistant and is distinguished by strong adhesion to various surfaces especially old oil paint films. In other words, the emulsion paint, once it has dried, is to be irreversible in character; such dried film to have the important advantages of an oil paint film, and even excelling such film in certain properties, while the original emulsion possesses the advantages above mentioned of an aqueous emulsion paint.

It is accordingly the general object of the present invention to provide aqueous polyvinyl acetate emulsion paints which are characterized by the capacity for depositing protective and decorative films which, despite their aqueous origin, are extraordinarily resistant to water and compare favorably with oil paint films.

More specifically, it is an object of the invention to provide a paint composition of the type indicated which is stable over long periods of time and suffers no appreciable permanent change in consistency on storage.

It is a further object of the invention to produce an aqueous emulsion paint of the type indicated which has a high degree of adhesion to various kinds of hydrophobic surfaces, including old oil paint surfaces, and whose films are unaffected by wide changes in temperature and in relative humidity.

Still another object of the invention is to provide an aqueous emulsion paint possessing good paintability and characterized also by ease of application.

It is a still further object of the invention to provide a composition of the type described which yields films that are highly resistant to washing and scrubbing with the usual detergents.

It is also an object of the invention to provide an aqueous emulsion paint capable of holding in stable suspension relatively large proportions of pigments and fillers whereby a high degree of hiding power is secured.

Other objects and advantages of the invention will appear from the following detailed description and the features of novelty will be set out in the appended claims.

I have found that an aqueous polyvinyl acetate emulsion modified by a filming or "conditioning" agent as described in the above-mentioned earlier application so as to form water-resistant film on drying at room temperature, can be made to form the vehicle or binder for a paint having the desirable qualities referred to above, and particularly that of adhesion to old paint films. The original emulsion is modified, in accordance with the invention, by various additions, made at different stages in the manufacture of the paint, whereby various desirable qualities are imparted to the emulsion paint without affecting the essential stability thereof. Included among these additions are keying agents, which enable the emulsion paint to adhere strongly to various kinds of surfaces, and especially to old oil paint films and at the same time are compatible with the polyvinyl acetate resin both in its emulsion and in its dried form. I have found that other additions, such as materials designed to improve the "yield" or paintability of the emulsion, and also plasticizers, can likewise be made in considerable quantity without disturbing the stability of the emulsion containing a keying agent where the original aqueous polyvinyl acetate emulsion has been properly prepared.

The nature and quantity of these several additions are in general determined by the type of paint desired, and they are selected or their proportions adjusted with the properties of the original polyvinyl acetate emulsion in view. Thus, with smaller emulsion particle size, larger quantities of pigment and of extending or "yield"-increasing agents can be used; while in view of the acidic character of the aqueous medium, basic pigments like zinc oxide should not be employed, except possibly in small quantities.

The aqueous emulsions employed in the present invention are prepared, for example, as described in pending application Serial No. 598,383, by polymerizing vinyl acetate in water with the aid of a hydrophilic emulsifier, and preferably with the aid also of a surface-active agent, the use of a catalyst being also recommended. The resulting polyvinyl acetate emulsion may have an average particle size of up to about 5 microns, the lower particle sizes, say of 0.5 micron or even lower, being preferred. According to the process described in the aforementioned application, there is mixed into such emulsions, with vigorous stirring, a conditioning agent which controls and insures the deposition of a uniform continuous stable film under various conditions of temperature and humidity. These conditioning agents are in the form of organic materials, and preferably of mixtures of such materials, which as a whole have only a limited solubility in water and have a solvent or swelling action on the polyvinyl acetate resin, the function of such conditioning agents being to reverse the original system in which the hydrophilic emulsifier was present in the dispersing phase to one in which such emulsifier becomes part of the dispersed phase, that is, becomes dispersed within the resinous film body formed by the coalescence of the previously dispersed resin particles as the water evaporates. In the present process, the conditioning agent or agents are preferably added to the aqueous emulsion only after the various substances described more fully hereinbelow, which convert the emulsion into a paint having the properties above described, have been mixed with the emulsions.

It will accordingly be seen that the composition of the present invention is in the nature of a combined aqueous emulsion paint and pigmented lacquer. Whereas a conventional oil paint consists primarily of an oil base or vehicle which except for any solid resin that may be incorporated therein is liquid in character and forms a dry film in situ by oxidation, that is, by chemical action, the film-forming component of the present composition is solid in nature and is deposited without the aid of chemical change upon evaporation of the dispersing medium. As is well known, an oil paint film changes in nature throughout a long period of time, the deposited paint film being slow drying in character. It is composed mostly of film-forming material and is rather easily applied. In the case of the conventional lacquer the film is formed by simple evaporation of solvent, the film-forming component being solid in character and not being formed in situ by chemical change. The lacquer film is characterized by being permanent in character, that is, as permanent as the solid resins employed in making up the lacquer. Lacquers are fast drying in nature and are easily applied; on the other hand, because the resinous component forms highly viscous solutions, there is only a small portion of film-forming material in the lacquer so that, unlike oil paints, only rather thin films can be produced with a single brushing.

The major advantage of lacquer type compositions over oil paints is thus the fact that in the case of a lacquer, no change is necessary in situ to effect formation of a solid continuous film. If a lacquer could be improved in certain particulars, for example, by enabling it to embody a larger amount of film-forming material, and by elimination of the large proportion of volatile solvent that is employed, it could acquire some of the advantages of oil paints.

The emulsion type of coating compositions of the present invention enables the use of film-forming solid resins which require no chemical change to deposit a solid film, and it is apparent that if the volatile solvent or thinner can be decreased or even eliminated they will be superior to conventional lacquers from the standpoint of economy and the absence of objectionable quantities of malodorous and inflammable vapors. The high viscosities usually encountered in solutions of resins in organic solvents are not met with, at least not to so great an extent, in the emulsions of the present invention because the resinous material is not present in solution but only in the form of dispersed particles. On the other hand, the necessity for employing hydrophilic substances as emulsifying agents to suspend the polyvinyl acetate in the aqueous medium presented a difficulty, where, as is usually the case, the formation of a water-resistant film was required.

The polyvinyl acetate resins employed in the present invention have heretofore given excellent lacquer types of coatings when dissolved in organic solvents, but they had the defect common to lacquers generally that the solid content of the solution was low, and the adhesion to certain surfaces was not as good as that of known oil paints. The present invention contemplates overcoming the difficulties inherent in polyvinyl acetate lacquers by employing the polyvinyl acetate in the form of an aqueous emulsion containing a keying agent, such emulsion form making it possible to control the viscosities, to use high polymers, and to eliminate practically all of the volatile solvent while yet producing a composition which is capable of suspending large quantities of pigment therein and yield a film which is non-sensitive to water and has high adherence to practically all surfaces.

An aqueous dispersion of polyvinyl acetate containing in addition to the hydrophilic emulsifier also an organic conditioning agent (as defined in the above-mentioned application and explained more fully below) represents a highly delicate system subject to the influences of many variables, the disturbance of any one of which can quite easily cause coagulation or flocculation, excessive increase or decrease of voscosity, loss of paintability, loss of adhesion of the deposited film or of resistance to weather influences, and the like. In general, I have found that in adding a particular ingredient to the emulsion complex in order to impart to it a certain desired property, the ingredient must be so chosen as not deleteriously to affect the other components of the mixture, or compensating changes must be made in the quantity or nature of the other components. While polyvinyl acetate emulsions of various particle sizes and film-forming properties may be employed, certain types of emulsions are preferable to others because of their greater stability to the variations in temperature encountered in commercial storage and use, or to the additions of the various agents designed to impart special characteristics to the emulsion or to the deposited film.

Suitable emulsions for the purposes of the present invention are, for example, those utilizing a combination of gum tragacanth and partially hydrolyzed polyvinyl acetate, or partially hydrolyzed polyvinyl acetate alone, or gum arabic, as the protective colloid or emulsifying agent, together with a compound of the type of di-normal octyl sodium sulfosuccinate as an interfacial tension depressant.

The finer particle size emulsions of the type hereinbefore referred to will permit a greater concentration of pigment to be stably incorporated therein before film failure or film weakening occurs. Employing the normal terminology, whereby pigment concentration is expressed as a volume per cent of the total volume of the non-volatile ingredients of the paint, I have found that an emulsion of 3 microns average particle size will tolerate as much as 32 per cent pigment volume; that an emulsion of a 2 micron average particle size will tolerate up to about 35 per cent of pigment volume; while an emulsion of about 0.5 to 1 micron particle size will tolerate as much as 38 per cent pigment volume and yet yield continuous, non-chalking films. Since pigment volume tolerance governs the hiding capacity of the paint, I prefer the finer particle size emulsions.

Except for pigments which are reactive toward the emulsions, and particularly toward the slight concentrations of acetic acid in such emulsions, such pigments being represented, for example, by zinc oxide, most of the normally employed paint pigments, fillers and extenders, may safely be incorporated in the compositions of the present invention. A highly satisfactory pigment is titanium dioxide, but other relatively inert pigments, either organic or inorganic in nature, and having the necessary fineness, may be employed. Among such pigments are bone black, Venetian red, Tuscan red, mineral black, iron oxides, lithopene, zinc sulfides, mixed pigments, like barium-titanium, calcium-titanium, magnesium-titanium, etc. Any concentration up to just below the amount which would destroy the physical properties and/or contiunity of the resin film may be used.

It is known that polyvinyl acetate films exhibit poor adhesion to hydrophobic surfaces, like old oil paint films. I have, however, found that by the addition of a keying agent in the form of an alkyd resin of either drying or non-drying types, or of a mixture of a drying oil such as linseed oil and an active oil paint film softener such as acetone oil, or of any oleoresinous paint, or of certain resins sold under the name "Piccolyte," "Cumar" and "Pentalyn," excellent adhesion to hydrophobic surfaces is imparted to the emulsion composition. Where an alkyd resin is used, I prefer to employ one which in the particular emulsion composition to which it is added will not cause brush fouling. By employing concentrations of about 25 to 50 parts of alkyd resin to 250 parts of solid polyvinyl acetate, the adhesion of the film to oil paint surfaces is made equal to or superior to that of one oil paint film to another. The amount of alkyd resin can, of course, be reduced, but the adhesion powers will generally likewise be correspondingly diminished.

The keying agent employed should be one that will not cause coagulation of the emulsion, nor excessive brush fouling when the paint is used. Satisfactory types of alkyd resins are the drying alkyd "Rezyl 869," and the non-drying type alkyd "Rezyl 42."

Rezyl 869 is a linseed fatty acid modified, glycerol-phthalic anhydride alkyd resin of the drying type, while Rezyl 42 is a similer glycerol ester resin but of the non-drying type. Piccolyte S-25 and S-85 are polyterpene hydrocarbon resins of different softening point grades. Cumar RS is a cumarone-indene resin of soft rubber grade; while Pentalyn A is a pentaerythritol-rosin ester gum.

In the preferred method of preparing the aqueous paint, an aqueous polyvinyl acetate emulsion is heated with vigorous agitation and there are added thereto the pigment material and the keying agent, in either order, or there may be added only the keying agent, while continuing the agitation. The suspension is then allowed to cool to approximately room temperature. The pigment is then added if it has not previously been mixed with the heated emulsion, together with the extending agents. The present invention also contemplates providing what may be called a binder or vehicle to which are to be added the pigments and extending agents by the ultimate user, so that if only the vehicle is to be manufactured, then these materials are omitted. In any event, whether or not the pigments and extending agents are included in the composition, there is added to the cooled mixture a liquid containing or consisting of one or more organic materials which are solvents or swelling agents for the polyvinyl acetate resin and which have limited solubility in water. These agents have above been referred to as "conditioning" agents. Where only one of these agents is employed, it should have, as just stated, only a limited solubility in water; however, where a number of these conditioning agents are employed in combination, it is sufficient if the combination as a whole has a limited solubility in water; certain components of such mixture may, however, have considerable solubility or even be completely water-miscible. The conditioning agent or agents are added in limited amounts, that is, in amounts considerably less than those ordinarily employed in preparing coating solutions of the resin. While I do not wish to be understood as being committed to this theory, it appears that the limited amount of conditioning agent brings about, from a certain point in the drying of the film onwards, the masking of the hydrophilic colloid originally employed in making the parent emulsion; so that, whereas originally the polyvinyl acetate particles were enveloped by the hydrophilic colloid and by a suspension of the colloid in the aqueous dispersion medium, towards the latter part of the drying of a deposited film of the emulsion composition, the hydrophilic colloid is in turn surrounded and thus masked by the conditioning agent in conjunction with the resin. The volatile portion of the conditioning agent, upon continued drying, is of course more or less completely expelled from the film. It will thus be seen that the conditioning agent in effect acts to bring about a reversal of conditions in the emulsion composition as the drying proceeds, so that the action or effect of the hydrophilic colloid which originally permeated the whole composition, is destroyed. This action, I believe, accounts for the fact that films prepared with the emulsion compositions show no tendency to re-emulsify despite the fact that the emulsifying agent is still present in the film.

As described in the above-mentioned application, a definite relationship must exist between emulsifier concentration and the average particle size of the solid phase, for emulsions to be useful in the present invention. The relationship is an inverse one and for satisfactory results the emulsifier concentration must not exceed certain limits for a given average resin particle size, and vice versa. As disclosed in the earlier application, the threshold curve may be represented by the formula:

$$x(y-b) = k$$

where $x$ is the average particle size in microns and $y$ is the per cent emulsifying agent based by weight on the resin, $b$ and $k$ being constants having the values about 0.5 and about 9, respectively. I have found that when the respective coordinates have a value at least as small as that which satisfies the equation, the emulsions yield satisfactory paints when further processed in accordance with the present invention.

In one suitable type of emulsions there are used, as emulsifiers, two organic hydrophilic colloids which have the ability to act together to form a stable emulsion at a much lower concentration than that at which one would act alone; the emulsifier concentrations may be relatively low, preferably less than about 1.2% by weight of the emulsion and are disclosed in the patent to Henry Michael Collins, No. 2,388,600 dated November 6, 1946. Under normal conditions of preparation the particle diameter size of this type averages from about 3.5 microns downward. Other classes of emulsion are those employing as emulsifiers respectively hydrolyzed polyvinyl acetates, and a highly water-soluble natural gum, for instance, of the arabin type. With these latter classes relatively greater amounts of emulsifier are generally employed to achieve stability so that special steps are taken during its manufacture to reduce the average particle size to within the operative range (for the particular emulsifier concentration required for stability). Compounded with conditioning agents as herein described, all these emulsions, provided that they satisfy the above equation, are suitable for the purposes of the present invention.

These particular emulsion types are merely illustrative of those which may be used according to the invention, and it will be understood that the invention is not necessarily limited to their use.

The conditioning agents comprise, in general, one or more organic solvents for the resin, with or without a plasticizer. The solvents should be liquids capable of exerting a solvent or at least a swelling action on the resin, and may belong to one or both of the following groups, namely, (1) water-immiscible solvents, and (2) solvents having definite but limited solubility in water, usually not greater than about 10%. Preferably, the solvent, or mixture of solvents as a whole, will have some solubility in water. The solvents should be sufficiently volatile to be essentially completely expelled from the dried film. The plasticizer can be one of those generally employed for the resin.

These conditioning agents are employed in less than about 25%, generally in an amount within the range from about 3% to about 25% by weight of the parent emulsion. The specific concentration employed is generally correlated to the emulsifier concentration, particle size and polymer viscosity, so that the amount employed is sufficient, preferably just sufficient, to perform the water-proof filming function. As particle sizes or emulsifier concentrations are lowered, the amount of conditioning agent necessary for water-resistant filming usually becomes less.

The paint films obtained with the coating compositions of the present invention are resistant to water, to the extent that they will not re-emulsify or disintegrate when immersed for a period of 24 hours and even longer in water at a temperature of about 20° C. To all intents and purposes, therefore, they have the characteristics of pigmented solvent type polyvinyl actetate lacquers, films or coatings.

It is desirable to incorporate in the emulsion also a higher boiling solvent where the film is to be deposited at a low temperature, such as 5° C. and lower. A low boiling solvent alone may produce a chalky film if the emulsion is applied at too low a temperature; replacement of part of the low boiling solvent with one or more higher boiling solvents or swelling agents results in satisfactory filming at 5° C. or lower. The particular solvents and their proportions will be selected and adjusted in any particular case with the conditions of use of the paint emulsion in view.

Among the solvents that may be used are vinyl, ethyl, and butyl acetates, butyl beta-hydroxy butyrate, benzene, cyclohexanone, toluene, xylene, Cellosolve acetate, isophorone, and other solvents of organic nature which are insoluble, or have a low solubility in water, and also mixtures of solvents. Where a lacquer solvent like butyl acetate is used, better keying to lacquer films will be obtained.

The plasticizers above referred to may be any material capable of plasticizing polyvinyl acetate resin and particularly those which are equivalent in their effects to dibutyl phthalate. Among these may be mentioned other alkyl esters of dicarboxylic aromatic acids, like diethyl phthalate; butyl phthalyl butyl glycollate ("Santicizer B 16"); ethyl phthalyl ethyl glycollate ("Santicizer E 15"); diethylene glycol dipropionate such as that sold under the trade name KP 45; and diethylene glycol diacetate. Somewhat less efficient are polyethylene glycol di-2-ethyl hexoate ("Flexol 4 G O") and triethylene glycol di-2-ethyl butyrate ("Flexol 3 G H"), dibutyl sebacate, tributyl phosphate and dioctyl sebacate. Mixtures of these plasticizers may be used, and in any case the quantities and the particular plasticizers must be selected and adjusted with the particular purposes in view, so as to control the tack, flexibility and volatility of the compositions. If desired, there may be used also certain stable resinous materials, such as copolymers of vinyl acetate with butyl and octyl crotonates, for example, a copolymer containing about 35% polybutyl crotonate and polyvinyl acetate, the copolymer being a semi-liquid at room temperature.

The plasticizers serve to impart flexibility to the paint film so that it will not chip or break apart under the stress of abrasion or of the elements or as a result of rubbing or washing. As a general rule, about 10 per cent plasticizer based on the weight of solid polyvinyl acetate in the paint emulsion in sufficient to impart flexibility. The amount, however, will vary to some extent with the specific polyvinyl acetate used, that is, the higher the polymer the more plasticizer will usually be required, but in any case it should be sufficient to make the film resistant to temperature changes. The plasticizer and the organic solvent are supplementary in their action as conditioning agent, so that an increase in concentration of the one allows a decrease in concentration of the other.

The following emulsions are typical of those which are suitable for use in preparing the compositions of the present invention:

EMULSION "A"

In the preparation of one parent emulsion there were employed the following materials:

| | |
|---|---:|
| Dispersion medium—water_____parts__ | 800 |
| Monomer—vinyl acetate _____do____ | 900 |
| Emulsifiers (per cent by weight on the total charge): | |
|   (1) Gum tragacanth_____per cent__ | 0.25 |
|   (2) Partially hydrolyzed polyvinyl acetate containing 37% polyvinyl acetate by weight, made from polyvinyl acetate of viscosity 7 cps. (at 20° C.; 86 g. p. l. in benzene) _____per cent__ | 0.5 |
| Surface active agent (per cent by weight on the total charge): "Aerosol O. T." (sodium salt of the sulphonic acid of dioctyl succinic ester) _____per cent__ | 0.1 |
| Catalyst (per cent by weight on the vinyl acetate): Benzoyl peroxide_____per cent__ | 0.166 |

These materials were charged into a suitable jacketed kettle equipped with a reflux condenser and effective stirring mechanism. The temperature was brought to about 66° C. (reflux temperature) and the charge was held at reflux until the temperature rose to 83° C. The charge was then cooled to about 30° C. and then dumped. The emulsion formed was stable and had about the following characteristics:

| | |
|---|---|
| Viscosity of emulsion (20° C.) centipoises | 700 |
| Total solids per cent | 55 |
| Residual vinyl acetate do | .9 |
| Polyvinyl acetate viscosity (86 g. p. l. in benzene at 20° C.) centipoises | 145 |
| Average particle size microns | 3.5 |

The various emulsifiers which can be used in combination with one another are described in detail in the above-mentioned patent of Henry Michael Collins, No. 2,388,600. According to such patent, the colloids are classified into "negative" and "positive" types. Among suitable colloids of the negative types are hydrophilic colloidal starches, partially hydrolyzed polyvinyl acetates containing from about zero to about 35% (±2%) polyvinyl acetate, natural gums such as, for example, gum tragacanth and gum arabic, algin, such as, for instance, agar-agar, and the commercial algins known as "Gomagel," and gelatin. Among colloids of the positive type are hydrophilic colloidal partially substituted cellulose such as methyl cellulose and benzyl cellulose, and partially hydrolyzed polyvinyl acetate containing between about 37% (±2%) and about 43% polyvinyl acetate.

Generally speaking, one of the positive type is used with one of the negative type and, in certain cases, two of the negative type may be used. In any event, the two agents are employed so that they can be used at a concentration less than that at which either agent alone would stabilize the emulsion. The preferred total concentration is between about .5% and about 1.2% by weight of the emulsion, but for the present purposes, more emulsifier may be used if desired, that is, up to about 1.7%.

An anionic surface-active agent is also employed in conjunction with the colloids at a concentration between about .05% and about .3% by weight of the emulsion.

EMULSION "B"

The following constituents were employed in substantially the following proportions:

| | |
|---|---|
| Dispersion medium—water parts | 880 |
| Monomer—vinyl acetate do | 900 |
| Emulsifier (per cent by weight on the total charge): gum arabic per cent | 2.5 |
| Surface—active agent (per cent by weight on the total charge)—"Aerosol O. T." (sodium salt of the sulphonic acid of dioctyl succinic ester) per cent | 0.15 |
| Catalyst (per cent by weight on the vinyl acetate): Hydrogen peroxide (in the form of a 28% solution) per cent | 0.024 |
| Acid modifying agent (per cent by weight on the total charge): Glacial acetic acid per cent | 0.5 |
| Accelerator—iron chloride (FeCl₃.6H₂O) do | 0.002 |

The aqueous charge consisting of the emulsifier, the surface-active agent, the modifying acid, the accelerator and one-quarter of the catalyst was charged into a kettle equipped with a reflux condenser and effective stirring mechanism. Stirring was begun and one-tenth of the vinyl acetate was added. The charge was heated to reflux (about 66° C.), and the temperature was raised slowly to about 75° C. while maintaining reflux. Then, the remainder of the vinyl acetate containing the rest of the catalyst was added at a uniform rate such that the reaction temperature was easily maintained at about 78° C., and the polymerization was complete in three hours or less. The charge was cooled to about 30° C. while stirring and then dumped.

The final emulsion had substantially the following physical properties:

| | |
|---|---|
| Average particle size | 0.8 micron |
| Polyvinyl acetate about 75% insoluble viscosity of remainder | 35 centipoises |
| Stability | More than 6 months |
| Emulsion viscosity | 600 centipoises (Hoeppler) |
| Solids | 53% |
| pH | 3.6 |
| Residual vinyl acetate | 1.9% |
| Per cent acid (as acetic acid) | .6% to .7% |

It is important to note that the vinyl acetate is added portion-wise, for instance, a reasonable procedure is to add about 10% of the monomer initially and then to add the remainder slowly in a continuous flow. This has the effect of reducing particle size, of maintaining an even or narrow particle size distribution curve and of decreasing polymerization time. The $Fe^{+++}$ ion apparently acts as an accelerator in that it causes a change in the kinetics of polymerization from that of "mass" type to that associated with the "active centre propagation" type. Hence, even mild agitation results in emulsions of an exceptionally fine average particle size. The added acid acts as a controlling agent in preventing too rapid a loss of catalyst. Sufficient acetic acid is preferably employed to prevent destruction of the hydrogen peroxide catalyst, producing generally in the final emulsion a pH from about 3.2 to about 3.8 although under some conditions more acid may be used.

The emulsifiers employable are natural highly water-dispersible gums, for instance, those of the arabin type and other natural gums which tend to give relatively clear and homogeneous water dispersions. The amounts employed are preferably less than about 4% by weight of the emulsion, good results being obtained with from about .5% to about 3%, with the limitation that the emulsifier concentration-particle size relationship discussed above is maintained. If there are traces of iron in any of the constituents of the charge, for instance, in the emulsifier, the amount added may be decreased and in certain cases, eliminated.

EMULSION "C"

An emulsion was prepared in accordance with the procedure outlined for Emulsion "B" with the exception that there was employed as the emulsifier 3% by weight on the emulsion of partially hydrolyzed polyvinyl acetate made from polyvinyl acetate of viscosity of 600 centipoises (86 g. p. l. in benzene at 20° C.) and containing about 16% polyvinyl acetate.

The final emulsion had substantially the following physical properties:

| | |
|---|---|
| Viscosity of emulsion 20° C centipoises | 800 |
| Total solids per cent | 54 |
| Residual vinyl acetate do | 1.2 |
| Polyvinyl acetate viscosity centipoises | 43 |
| Average particle size micron | 1.0 |

The synthetic hydrophilic colloid employed in this emulsion may be either partially hydrolyzed polyvinyl acetate or similar substances, for instance, derivatives of polyvinyl acetate such as hydrophilic partial acetals or ethers. The partially hydrolyzed polyvinyl acetates preferably employable are those containing up to about 43% polyvinyl acetate. These bodies may be made from polyvinyl acetates having a viscosity within the range from about 7 to about 1000 centipoises. The amount employed is preferably less than about 4% by weight of the emulsion, good results being obtained with from about 1% to about 3%, within the limits of the particle size-emulsifier concentration relationship defined herein.

Generically speaking, it is seen that these preferred Emulsions "A," "B" and "C" are stabilized by viscous organic hydrophilic colloids stable to mild acid and base in aqueous medium and substantially neutral as to pH at a total concentration ranging from about .5% to about 4% by weight of the emulsion. It is also preferable to employ an anionic surface-active agent at a concentration ranging from about .05% to about .3% by weight of the emulsion.

The emulsion viscosity may range from about 80 centipoises to about 50 poises, the preferred range being from about 200 to about 2000 centipoises.

The polyvinyl acetate viscosity may vary from about 7 centipoises to about 1000 centipoises with viscosity from about 25 to about 200 centipoises preferred. Insoluble polyvinyl acetate may be present in relatively large amounts and the emulsion will still fall within the demands of the invention. The concentration of the polyvinyl acetate in the emulsion may range from about 30% to about 65% by weight, with from about 50% to about 60% preferred.

In emulsions of the type of Emulsion "A," the average particle size is generally about three and one-half microns representing a range from about two to about five microns with approximately ten per cent of fine particles (less than about two microns), ten per cent of coarse particles (more than about five microns) and eighty per cent close to the three and one-half micron average.

In the case of the "B" and "C" type emulsions, the average particle size is generally about eight-tenths of a micron representing a range from about one-half micron to about one micron with over eighty per cent of the particles close to the average of about eight-tenths of a micron.

Where paints prepared with the emulsion compositions above described are to be employed in humid atmospheres, and especially when coatings are to be applied at relatively low temperatures, particularly when accompanied by high relative humidities, the conditioning agent, or at least one of them where two or more are employed, should be of a relatively low vapor pressure, that is, of generally high boiling point. The use of such a higher boiling point conditioning agent insures that, with the retarded evaporation of the water by reason of the low temperature and possibly also a high relative humidity, the organic solvent will not evaporate at a relatively higher rate. In this way, the coating is prevented from losing the conditioning agent while the resin particles, or a large number of them, are still in discrete form. Where the coating is to be applied at low temperatures and low relative humidities, the same desideratum can be achieved by increasing somewhat the total amount of the volatile conditioning agent; however, improved film formation can then also be obtained by the use of a higher boiling conditioning agent.

The following are examples of aqueous emulsion paints prepared in accordance with the present invention, utilizing the film-forming emulsions described hereinabove, but it will be understood that these examples are presented only for purposes of illustration and not as indicating the limits of the invention:

Example 1

PART A

| | Parts by weight |
|---|---|
| Polyvinyl acetate emulsion, 50% solids | 500 |

PART B

| | |
|---|---|
| Rutile titanium dioxide | 275 |
| Waterground mica, 325 mesh | 30 |
| Micronized mica | 30 |
| Domestic china clay | 30 |
| Diatomaceous earth | 35 |
| Water | 300 |

PART C

| | |
|---|---|
| Alkyd resin (Rezyl 869) | 35 |

PART D

| | |
|---|---|
| Ethyl acetate | 41 |
| Dibutyl phthalate | 25 |
| Water | 4.5 |

The polyvinyl acetate emulsion can, for example, be Emulsion "B" described above. In general, polyvinyl acetate emulsion having the particle sizes above discussed can be adapted for the purposes of the present invention.

The procedure of manufacture is as follows: Part A, representing the polyvinyl acetate emulsion, is placed in a jacketed enclosed kettle, agitated by means of revolving propeller blades at about 2500 revolutions per minute and heated to about 55° C., care being taken not to go above about 60° C. lest coagulation of the dispersion occur.

Part B, representing the pigment mix (including the extender or "yield" producing agents), is uniformly dispersed with the water indicated, by means of a ball mill or other suitable mechanism, so as to give a smooth paste, the pigment being in the usual finely divided form. After Part A has reached 55° C., Part B is added, agitation being continued for from 5 to 10 minutes before the addition of Part C. While the pigment and extender material may be added dry, it is generally desirable to mix them in the form of an aqueous dispersion.

Part C, representing the alkyd resin, is separately heated to about 60° C., at this temperature being a fairly free flowing liquid, and in this condition is added to the mixture of Parts A and B, agitation at the temperature of about 55° C. being continued for from 5 to 10 minutes; after which the contents of the kettle are cooled to from 20° to 25° C. with constant agitation. Care should be taken to add the alkyd resin at a suitably high temperature to avoid coagulation of the dispersion. Thus, with the alkyd resin above named, addition at a resulting temperature of considerably lower than 50° C. may result in coagulation.

Part D, representing the solvent-plasticizer charge, is thoroughly mixed with the small quantity of water indicated so as to yield a temporary dispersion of the water in the solvent-plasticizer, and then added to the kettle. As a general rule, dispersion of the small amount of water in the solvent-plasticizer solution assists in the dispersion of the entire charge in the paint. After addition of Part D, agitation is continued for about 15 minutes longer to insure complete dispersal.

The product is a free flowing liquid, with a consistency similar to that normally encountered in paints. It possesses good paintability and dries to a uniform hard, opaque, semi-lustrous film on plaster, wood and other surfaces, and especially on old oil paint films. The film is dust-free after drying in air for about 20 minutes, and is water-resistant in about 2 hours. The paint can be readily thinned with water and can be brushed, sprayed or applied in any other manner common with paints. The dried film allows the passage of water vapors and hence can be applied over surfaces that are themselves not completely moisture free, such as green wood, raw cement, etc. The film is characterized by a high degree of resistance to abrasion and withstands scrubbing with water or mild soap solutions without deterioration to a degree at least equal to a good oil paint film. Its adhesion to various surfaces is unaffected by changes in temperature or humidity. The paint has been found to remain stable over long periods of time if not subjected to freezing or excessive heating. In general, the emulsion paint can be handled like an oil paint. The fire and health hazards with the improved paint are at a minimum.

*Example II*

Parts by weight

PART A

Polyvinyl acetate emulsion, 50% solids____ 500

PART B

Rutile titanium dioxide_____ 400
Water _____ 500

PART C

Alkyd resin (Rezyl 869)_____ 35

PART D

Ethyl acetate _____ 41
Dibutyl phthalate _____ 25
Water _____ 4.5

The procedure described under Example I is followed in making up the paint with the above composition. The polyvinyl acetate emulsion employed was one made with gum tragacanth and partially hydrolyzed polyvinyl acetate as protective colloids and di-normal-octyl sodium sulfosuccinate as an interfacial tension depressant, in the proportions hereinbefore described. The paint film had the properties mentioned under Example I.

*Example III*

Parts by weight

PART A

Polyvinyl acetate emulsion, 50% solids____ 500

PART B

Lithopone _____ 275
Waterground mica _____ 30
Micronized mica _____ 30
Domestic china clay_____ 30
Diatomaceous earth _____ 35
Water _____ 355

PART C

Alkyd resin (Rezyl 869)_____ 35

PART D

Ethyl acetate _____ 41
Dibutyl phthalate _____ 25
Water _____ 4.5

The above materials were compounded in the manner described under Example I. The polyvinyl acetate emulsion was one prepared with the aid of gum arabic, but emulsions containing other hydrophilic dispersing agents could also be used. A paint was obtained having good adhesion, hiding power, and the other desirable properties discussed above.

*Example IV*

In this modification of process of the invention there is first produced a vehicle or binder devoid of pigment material which may be marketed as such, to be mixed with any suitable pigment by and at the selection of the ultimate user. The order of mixing the ingredients is accordingly changed as follows:

Parts by weight

PART A

Polyvinyl acetate emulsion, 50% solids____ 500

PART B

Rezyl 869 _____ 35

PART C

Ethyl acetate _____ 41
Dibutyl phthalate _____ 25
Water _____ 4.5

The polyvinyl acetate emulsion is one prepared with gum arabic and is heated with stirring to about 55° C. whereupon the Rezyl 869 is added, the vigorous stirring being continued for a while and the mixture then being cooled to about 25° C., thereupon the mixture of ethyl acetate and dibutyl phthalate with the water suspended therein is added to the mixture with violent stirring until a uniform suspension is obtained. This mixture of parts A, B and C constitutes a vehicle or binder or paint base which may be marketed as such. The pigment, including the mica, clay and diatomaceous earth can be added to the vehicle with stirring after they have been formed into a slurry with the water. Such pigment mixture can have the following composition:

Parts by weight

PART D

Rutile titanium dioxide_____ 275
Micronized mica _____ 30
Mica 325 mesh_____ 30
Domestic china clay_____ 30
Diatomaceous earth _____ 35
Water _____ 300

The properties of the paint are similar to those of Example I.

*Example V*

The same materials and proportions were employed as in Example I except that Rezyl 42 was used in place of Rezyl 869. A paint of generally similar properties was obtained.

*Example VI*

Example V can be further modified over Example I by replacing part D with the following mixture:

PART D

Parts by weight

Cellosolve acetate (ethylene glycol ethyl ether acetate)_____ 15
Butyl phthalyl butyl glycollate _____ 40
Water _____ 6

An aqueous emulsion paint comparable to those of Examples I and V was produced.

In addition to the properties above discussed, the emulsion paints obtained in accordance with the above examples were extraordinarily resistant to what can be termed a "shock" test. This test comprises subjecting a bright tin metal test panel, holding a film of oil paint which is at least six months old, and over which my improved polyvinyl acetate emulsion paint has been applied and then aged for four days or more, to 19 hours' exposure at minus 40° C. followed by 5 hours under water at 20° C. The end point of the test is taken as the number of cycles which the film will withstand without lifting or falling off in the water. This test showed that the films obtained with the hereinabove described emulsion paints resist the shock test even better than many oil paints; in other words, they have better keying or adhesion to old oil paint films than oil paints themselves.

The above described emulsion paints are characterized also by good hiding power and paintability, the freshly applied paint showing no more sag than is obtained with an oil paint.

It has already been indicated that the conditioning agent (conditioning or filming agent) or solvents should have a limited solubility in water. It is desirable that this solubility in water at room temperature be not greater than that of butyl-beta-hydroxy butyrate. It will be understood that mixed solvents or swelling agents may be employed instead of a single solvent and/or swelling agent.

The conditioning agents are used at a concentration effective to perform a water-proof filming function at the particular emulsifier concentration and particle size of the emulsion to which they are applied, but the amounts should not be sufficiently high to reduce the stability or otherwise adversely affect the composition. Generally, the amounts range from about 3% to about 25% by weight of the emulsion but vary specifically for particular agents. The minimum amounts also vary with the temperature at which the composition is to be employed. The following are illustrative of the concentrations which can be used in compositions to be employed at about 20° C. and upwards where the "A" type emulsions are concerned. Benzene or toluene is effective at a concentration ranging from about 9% to about 17% by weight on the emulsion when employed without a plasticizer. When used with a plasticizer for the polyvinyl acetate, these concentrations may be reduced somewhat, for instance, to that amount which is just sufficient to produce the desired film when the composition is deposited. For instance, 6% benzene with 5% dibutyl phthalate is substantially as effective as about 9% benzene without plasticizer. In conjunction with a plasticizer at concentrations ranging from about 1% to about 4%, benzene is effective in amounts ranging from about 9% to about 7%.

Certain agents which are practically ineffective when used alone are rendered effective by the use in conjunction therewith of a plasticizer. For instance, ethyl acetate when used alone requires concentrations of about 15% by weight of the emulsion whereas with about 3% plasticizer, this agent may be used at concentrations of about 10%, and with about 5% plasticizer at concentrations of about 8%. Generally speaking, therefore, ethyl acetate is effective at concentrations ranging from about 8% to about 11% when used with a plasticizer such as dibutyl phthalate at a concentration ranging from about 5% down to about 1%.

Other components may also be added to the emulsion. Among these are fillers, dyes, resins, oils and relatively neutral organic liquids. These can all be used in amounts within reason for certain specific or enhanced effects without changing the novel properties inherent in the dried film of the paint compositions according to the invention.

The process of dispersing the various conditioning agents in the paint emulsion vehicles includes the preparation of these agents before dispersion in the emulsion so that the emulsion vehicle viscosity will not be increased to any large extent when these agents are dispersed therein. To this end, and as described in the examples, water is admixed with the conditioning agent in an amount just in excess of the saturation point. This admixture is then introduced rapidly with efficient stirring, for instance, of the same type as used to form the emulsion, but at slower speeds usually not below 100 R. P. M. (in the type of apparatus described in the above-named patent), to the mixture of the parent emulsion and the keying agent, with or without pigment. A criterion of adequate dispersion is the presence of the solvent and plasticizer particles at a diameter not greatly in excess of those of the solid phase. This desideratum can be obtained by any system of agitation that tends to give liquid shear with the introduction of a minimum amount of air.

The paint films deposited are remarkably tough and adherent and possess grease, fat and oil resistance of the highest order, while pliability over a fairly wide temperature range can be achieved. Furthermore, an important property of these films resides in the fact that they will not re-emulsify or disintegrate even after long immersion in water. The film is somewhat fire-resistant and resists aging under the combined action of wind, sun, frost, gases and water and does not tend to yellow or discolor even when exposed to severe conditions.

Articles coated with the herein-disclosed emulsion paints can be baked or "stoved" to get faster drying and perhaps even a glossier film as a result of fluxing of the thermoplastic resin. Temperatures of 70–90° C. are satisfactory, but temperatures up to 150° C. can be used for a short time. In addition to faster drying, a higher resistance to water-spotting will generally also be obtained.

In the specification the viscosity measurements referred to in connection with the parent emulsions and coating composition emulsions are performed by the dropping ball method of 20° C. unless otherwise stated. Polymer viscosities are the viscosities in centipoises measured at 20° C. of a solution of 86.1 g. of the polymer in one liter of benzene.

I claim:

1. Process according to claim 13, wherein the emulsion has an average particle size of about 0.5 to 5.0 microns.

2. A paint composition comprising a suspension of a pigment in an aqueous emulsion containing resinous polyvinyl acetate as the dispersed phase, together with a liquid conditioning agent and a keying agent, the conditioning agent comprising an organic solvent for polyvinyl acetate resin and its quantity ranging from about 3% to about 25% by weight of the emulsion, and said keying agent being present in a quantity amounting to about 20% by weight of the solid polyvinyl acetate and selected from the group consisting of oil acid-modified alkyd resins, polyterpene hydrocarbon resins, cumarone-indene resins, and pentaerythritol rosin esters, said emulsion being stable over an extended period of time and containing as an emulsifier a hydrophilic colloidal organic material in an amount effective to stabilize the emulsion, the emulsion being such that the coordinates $x$ and $y$ are at least as small as those satisfied by the equation $$x(y-b)=k$$

in which the coordinate $x$ is the average polyvinyl acetate particle size in microns, and the coordinate $y$ is the per cent emulsifying agent based by weight on the polyvinyl acetate, and $b$ and $k$ are constants of values of about 0.5 and 9, respectively, the average particle size of the resin phase and the amount of conditioning agent being so correlated as to render the composition capable of causing the formation, on deposition and drying, of a substantially continuous, water-resistant, relatively opaque film which is adherent to various surfaces and remaining so under different conditions of temperature and humidity.

3. A paint composition comprising a suspension of a pigment in an aqueous emulsion containing resinous polyvinyl acetate as the dispersed phase, a conditioning agent comprising a volatile organic solvent and a plasticizer for the resin, quantity of conditioning agent ranging from about 3% to about 25% of the weight of the emulsion, and an alkyd resin keying agent in an amount from about 10 to 20% by weight of the solid polyvinyl acetate, said emulsion containing as an emulsifier a hydrophilic colloidal organic material in an amount effective to stabilize the emulsion, the emulsion being such that the coordinates $x$ and $y$ are at least as small as those satisfied by the equation $$x(y-b)=k$$

in which the coordinate $x$ is the average polyvinyl acetate particle size in microns, and the coordinate $y$ is the per cent emulsifying agent based by weight on the polyvinyl acetate, and $b$ and $k$ are constants of values of about 0.5 and 9 respectively, the average particle size of the resin phase and the amount of conditioning agent being so correlated as to render the composition capable of causing the formation, on deposition and drying, of a substantially continuous, water-resistant, relatively opaque film which is adherent to various surfaces and remaining so under different conditions of temperature and humidity.

4. A paint composition comprising a suspension of a pigment in an aqueous emulsion containing resinous polyvinyl acetate as the dispersed phase, a hydrophilic colloidal material as the emulsifier in an amount effective to stabilize the emulsion, about 3% to about 25%, based on the weight of the emulsion, of a liquid conditioning agent selected from the group consisting of neutral organic solvents and organic swelling agents for the polyvinyl acetate having a solubility in water not exceeding 10%, and a quantity of a keying agent from about 10 to 20% by weight of the solid polyvinyl acetate and selected from the group consisting of oil acid-modified alkyd resins, polyterpene hydrocarbon resins, cumarone-indene resins, and pantaerythritol rosin esters, the emulsion being such that the coordinates $x$ and $y$ are at least as small as those satisfied by the equation $$x(y-b)=k$$

in which the coordinate $x$ is the average resin particle size in microns and the coordinate $y$ is the per cent emulsifying agent based by weight on the resin, and $b$ and $k$ are constants of value about 0.5 and 9, respectively, the amounts of the conditioning agent and of the emulsifier and pigment, and the average particle size being correlated to render said composition capable of forming when deposited a continuous, water-resistant, relatively opaque film.

5. A composition of matter for the formation of coatings and films according to claim 4, wherein $y$ does not exceed about 10% and $x$ does not exceed about 5 microns.

6. A paint composition comprising a suspension of a pigment in an aqueous emulsion containing polyvinyl acetate as the dispersed phase, a quantity of a keying agent about 10 to 20% by weight of the solid polyvinyl acetate and selected from the group consisting of oil acid-modified alkyd resins, polyterpene hydrocarbon resins, cumarone-indene resins, and pentaerythritol rosin esters, and about 3% to about 25%, based on the weight of the emulsion, of a liquid organic conditioning agent including a solvent for the resin, said solvent having a high boiling point and a solubility in water not substantially greater than that of butyl-beta-hydroxy butyrate, said emulsion containing as an emulsifier a hydrophilic colloidal organic material in an amount effective to stabilize the emulsion, the emulsion being such that the coordinates $x$ and $y$ are at least as small as those satisfied by the equation $$x(y-b)=k$$

in which the coordinate $x$ is the average polyvinyl acetate particle size in microns, and the coordinate $y$ is the per cent emulsifying agent based by weight on the polyvinyl acetate, and $b$ and $k$ are constants of values of about 0.5 and 9, respectively, the average particle size of the resin phase, the amount of emulsifying agent, and the amount of the conditioning agent being so correlated as to render the composition capable of causing the formation, on deposition and drying at temperatures from about 0° C. to about 20° C., of a substantially continuous, water-resistant, relatively opaque film.

7. A film having the characteristics of polyvinyl acetate resin and formed by depositing and drying an aqueous emulsion of polyvinyl acetate containing about 10 to 20% of a keying agent selected from the group consisting of oil acid-modified alkyd resins, polyterpene hydrocarbon resins, cumarone-indene resins, and pentaerythritol rosin esters together with a pigment in suspension, said film entraining a hydrophilic organic emulsifying agent but nevertheless not re-emulsifying or disintegrating when immersed in water at about 20° C. for a period of about 24 hours.

8. A coated article, comprising a foundation coated with a relatively opaque film deposited from an aqueous emulsion of polyvinyl acetate containing about 10 to 20% of an oil acid-modified alkyd resin based on the weight of the solid polyvinyl acetate together with titanium dioxide in suspension and dried, said film having the characteristics of polyvinyl acetate and entraining a hydrophilic organic emulsifying agent but not re-emulsifying or disintegrating when immersed in water for a period of about 24 hours at about 20° C. or when washed with mild soap solutions.

9. Process for the manufacture of an aqueous emulsion paint, which comprises agitating a heated aqueous polyvinyl acetate emulsion having a maximum temperature of about 60° C., adding to the agitated emulsion a water-wetted pigment and a quanity of a keying agent about 10 to 20% by weight of the solid polyvinyl acetate and selected from the group consisting of oil acid-modified alkyd resins, polyterpene, hydrocarbon resins, cumarone-indene resins, and pentaerythritol rosin esters gums, cooling the mixture and disbursing therein from about 3% to about 25%, based on the weight of the emulsion, of a conditioning agent for the polyvinyl acetate emulsion selected from the group consisting of neutral organic solvents and organic swelling agents for the polyvinyl acetate having a solubility in water not exceeding 10%, said emulsion containing also a hydrophilic colloidal material as emulsifier in an amount effective to stabilize the emulsion, the emulsion being such that the coordinates $x$ and $y$ are at least as small as those satisfied by the equation $$x(y-b)=k$$

in which the coordinate $x$ is the average polyvinyl acetate particle size in microns, and the coordinate $y$ is the per cent emulsifying agent based by weight on the polyvinyl acetate, and $b$ and $k$ are constants of values of about 0.5 and 9, respectively, the amounts of the conditioning agent and of the emulsifier and pigment, and the average particle size being correlated to render said composition capable of forming, when deposited, a continuous, water-resistant, relatively opaque film.

10. Process for the manufacture of an aqueous emulsion paint, which comprises agitating a heated aqueous polyvinyl acetate emulsion having a maximum temperature of about 60° C., adding to the agitated emulsion a water-wetted pigment and a quantity of an alkyd resin about 10 to 20% by weight of the solid polyvinyl acetate, cooling the mixture and disbursing therein from about 3% to about 25%, based on the emulsion, of a conditioning agent for the polyvinyl acetate emulsion selected from the group consisting of neutral organic solvents and organic swelling agents for the polyvinyl acetate having a solubility in water not exceeding 10%, said emulsion containing also a hydrophilic colloidal material as emulsifier in an amount effective to stabilize the emulsion, the emulsion being such that the coordinates $x$ and $y$ are at least as small as those satisfied by the equation $$x(y-b)=k$$

in which the coordinate $x$ is the average polyvinyl acetate particle size in microns, and the coordinate $y$ is the per cent emulsifying agent based by weight on the polyvinyl acetate, and $b$ and $k$ are constants of values of about 0.5 and 9, respectively, the amounts of the conditioning agent and of the emulsifier and pigment, and the average particle size being correlated to render said composition capable of forming, when deposited, a continuous, water-resistant, relatively opaque film.

11. Process for the manufacture of an aqueous emulsion paint, which comprises agitating an aqueous polyvinyl acetate emulsion at a temperature of about 50° to 60° C., adding to the agitated emulsion a water-wetted pigment and a quantity of an alkyd resin about 10 to 20% by weight of the solid polyvinyl acetate, cooling the mixture, and disbursing therein from about 3% to about 25%, based on the emulsion of an organic solvent for the polyvinyl acetate, and a plasticizer having a small amount of water disbursed therein, the solvent having a maximum solubility in water of about 10%, said emulsion containing also a hydrophilic colloidal material as emulsifier in an amount effective to stabilize the emulsion, the emulsion being such that the coordinates $x$ and $y$ are at least as small as those satisfied by the equation $$x(y-b)=k$$

in which the coordinate $x$ is the average polyvinyl acetate particle size in microns, and the coordinate $y$ is the per cent emulsifying agent based by weight on the polyvinyl acetate, and $b$ and $k$ are constants of values of about 0.5 and 9, respectively, the amounts of the conditioning agent and of the emulsifier and pigment, and the average particle size being correlated to render said composition capable of forming, when deposited, a continuous, water-resistant, relatively opaque film.

12. An aqueous emulsion paint vehicle comprising a stable, aqueous polyvinyl acetate emulsion in which are dispersed a quantity of a keying agent about 10 to 20% by weight of the solid polyvinyl acetate and selected from the group consisting of oil acid-modified alkyd resins, polyterpene hydrocarbon resins, cumarone-indene resins, and pentaerythritol resin esters, and from about 3% to about 25%, based on the emulsion, of a condition agent selected from the group consisting of neutral-organic solvents and organic swelling agents for the polyvinyl acetate having a solubility in water not exceeding 10%, said mixture being capable of forming a paint on addition of finely divided pigment material thereto, said emulsion containing a hydrophilic colloidal material as emulsifier in an amount effective to stabilize the emulsion, the emulsion being such that coordinates $x$ and $y$ are at least as small as those satisfied by the equation $$x(y-b)=k$$

in which the coordinate $x$ is the average polyvinyl acetate particle size in microns, and the coordinate $y$ is the per cent emulsifying agent based by weight on the polyvinyl acetate, and $b$ and $k$ are constants of values of about 0.5 and 9, respectively, the amounts of the conditioning agent and of the emulsifier, and the average particle size being correlated to render said composition, on suspension of a pigment therein, capable of forming, when deposited, a continuous, water-resistant, relatively opaque film.

13. Process for the manufacture of an aqueous emulsion paint, which comprises vigorously agitating pigment material with an aqueous polyvinyl acetate emulsion and with a keying agent selected from the group consisting of oil acid-modified alkyd resins, polyterpene hydrocarbon resins, cumarone-indene resins, and pentaerythritol rosin esters, while heating the mixture to a temperature no higher than 60° C., said keying agent being employed in a quantity up to about 20% by weight of the solid polyvinyl acetate, the pigment being substantially non-reactive toward the emulsion, said emulsion containing a hydrophilic colloidal material as the emulsifier in an amount effective to stabilize the emulsion, and a liquid conditioning agent comprising an organic solvent and plasticizer for polyvinyl acetate resin, the solvent having a maximum solubility in water of about 10%, the emulsion being such that the coordinates $x$ and $y$ are at least as small as those satisfied by the equation $$x(y-b)=k$$

in which the coordinate $x$ is the average polyvinyl acetate particle size in microns, and the coordinate $y$ is the per cent emulsifying agent based by weight on the polyvinyl acetate, and $b$ and $k$ are constants of values of about 0.5 and 9, respectively, the amounts of the conditioning agent and of the emulsifier and pigment, and the average particle size being correlated to render said composition capable of forming, when deposited, a continuous, water-resistant, relatively opaque film.

14. Process for the manufacture of an aqueous emulsion paint, which comprises mixing, under vigorous agitation, an aqueous polyvinyl acetate emulsion containing a hydrophilic colloidal material as the emulsifier in an amount effective to stabilize the emulsion, at a temperature of at least about 50° C. but no higher than about 60° C., with a water-pigment paste and a quantity of a keying agent amounting to from 10 to 20% by weight of solid polyvinyl acetate and selected from the group consisting of oil acid-modified alkyd resins, polyterpene hydrocarbon resins, cumarone-indene resins, and pentaerythritol rosin esters, cooling the mixture to approximately room temperature, and dispersing therein a mutually compatible organic solvent and plasticizer for polyvinyl acetate resin, the solvent having a maximum solubility in water of about 10% and being employed in quantity ranging from about 3% to about 25% of the weight of the emulsion, the emulsion being such that the coordinates $x$ and $y$ are at least as small as those satisfied by the equation $$x(y-b)=k$$

in which the coordinate $x$ is the average polyvinyl acetate particle size in microns, and the coordinate $y$ is the per cent emulsifying agent based by weight on the polyvinyl acetate, and $b$ and $k$ are constants of values of about 0.5 and 9, respectively, the amounts of the solvent and of the emulsifier and pigment, and the average particle size being correlated to render said composition capable of forming, when deposited, a continuous, water-resistant, relatively opaque film.

15. Process for the manufacture of an aqueous emulsion paint vehicle, which comprises heating an aqueous polyvinyl acetate emulsion to about 55° C. with vigorous agitation, adding an alkyd resin keying agent in molten condition while continuing the agitation and in an amount from about 10 to 20% by weight of the solid polyvinyl acetate, cooling the mixture to approximately room temperature, and adding a solvent and plasticizer thereto, the solvent having a maximum solubility in water of about 10% and being employed in a quantity ranging from about 3% to about 25% of the weight of the emulsion, said emulsion containing a hydrophilic colloidal material as the emulsifier in an amount effective to stabilize the emulsion, the emulsion being such that the coordinates $x$ and $y$ are at least as small as those satisfied by the equation $$x(y-b)=k$$

in which the coordinate $x$ is the average polyvinyl acetate particle size in microns, and the coordinate $y$ is the per cent emulsifying agent based by weight on the polyvinyl acetate, and $b$ and $k$ are constants of values of about 0.5 and 9, respectively, the amounts of the solvent and of the emulsifier, and the average particle size being correlated to render said composition, on dispersion of a pigment therein, capable of forming, when deposited, a continuous, water-resistant, relatively opaque film.

16. A paint composition comprising a suspension of a pigment in an aqueous emulsion containing resinous polyvinyl acetate as the dispersed phase together with a quantity of a keying agent amounting to about 10 to 20% by weight of the solid polyvinyl acetate and selected from the group consisting of oil acid-modified alkyd resins, polyterpene hydrocarbon resins, cumarone-indene resins, and pentaerythritol rosin esters, the emulsion containing a hydrophilic colloidal material as the emulsifier in an amount effective to stabilize the emulsion, and about 3% to about 25%, based on the weight of the emulsion, of a liquid conditioning agent selected from the group consisting of neutral organic solvents and organic swelling agents for the polyvinyl acetate having solubility in water not exceeding 10%, the emulsion being such that the coordinates $x$ and $y$ are at least as small as those satisfied by the equation $$x(y-b)=k$$

in which the coordinate $x$ is the average polyvinyl acetate particle size in microns, and the coordinate $y$ is the per cent emulsifying agent based by weight on the polyvinyl acetate, and $b$ and $k$ are constants of values of about 0.5 and 9, respectively, the amounts of the conditioning agent and of the emulsifier and pigment, and the average particle size being correlated to render said composition capable of forming, when deposited, a continuous, water-resistant, relatively opaque film, said film being adherent to various surfaces and remaining so under different conditions of temperature and humidity and not re-emulsifying or disintegrating on washing with water or mild soap or other common detergent solutions.

GEORGE O. MORRISON.

REFERENCES CITED

The following references are of record in the file of this patent:

UNITED STATES PATENTS

| Number | Name | Date |
|---|---|---|
| 2,134,006 | Roller | Oct. 25, 1938 |
| 2,316,629 | Schmitz | Apr. 13, 1943 |
| 2,385,800 | Douty et al. | Oct. 2, 1945 |
| 2,412,592 | Maier | Dec. 17, 1946 |
| 2,444,396 | Collins et al. | June 29, 1948 |